Jan. 8, 1963   B. STAHMER   3,072,197
AIRCRAFT

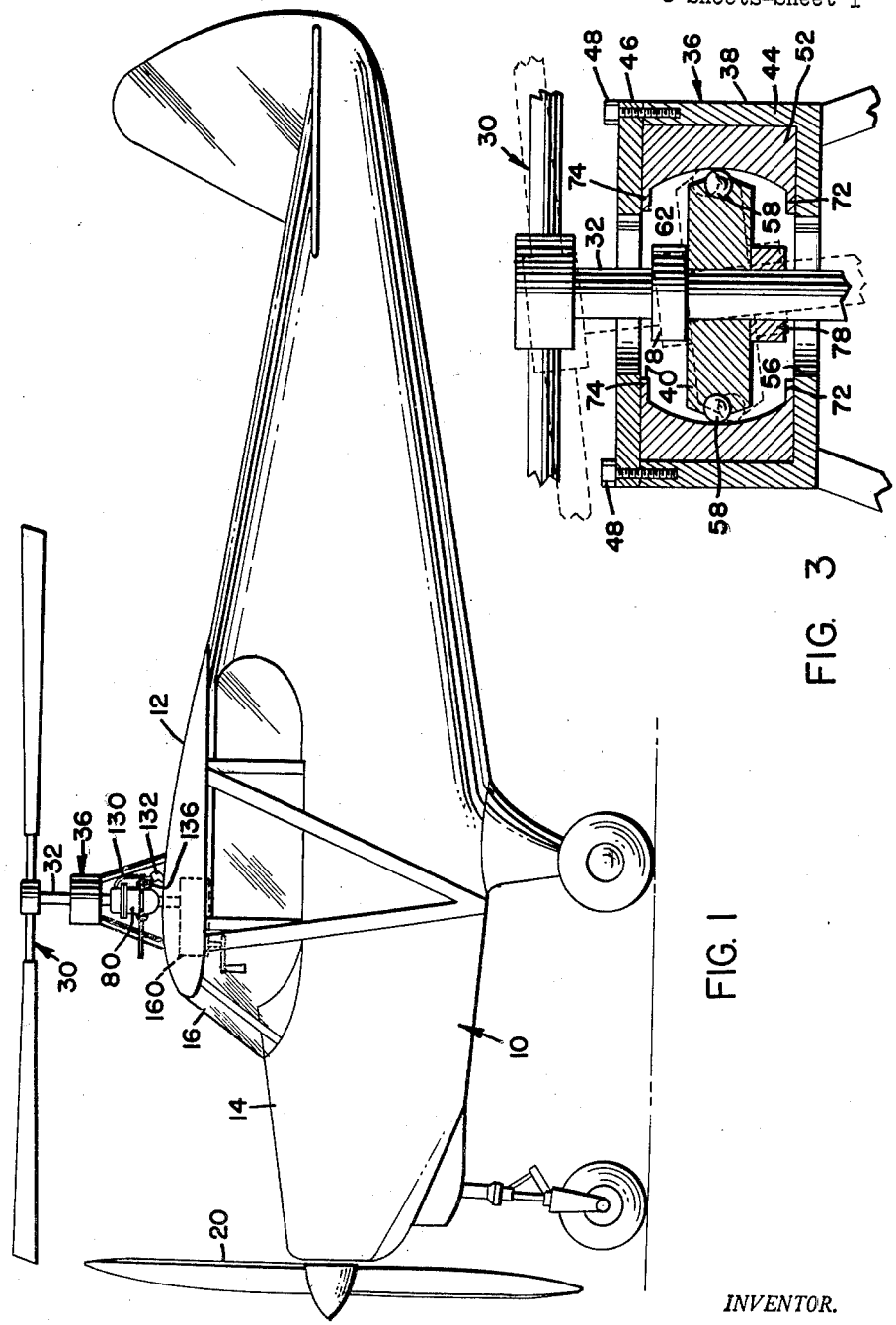

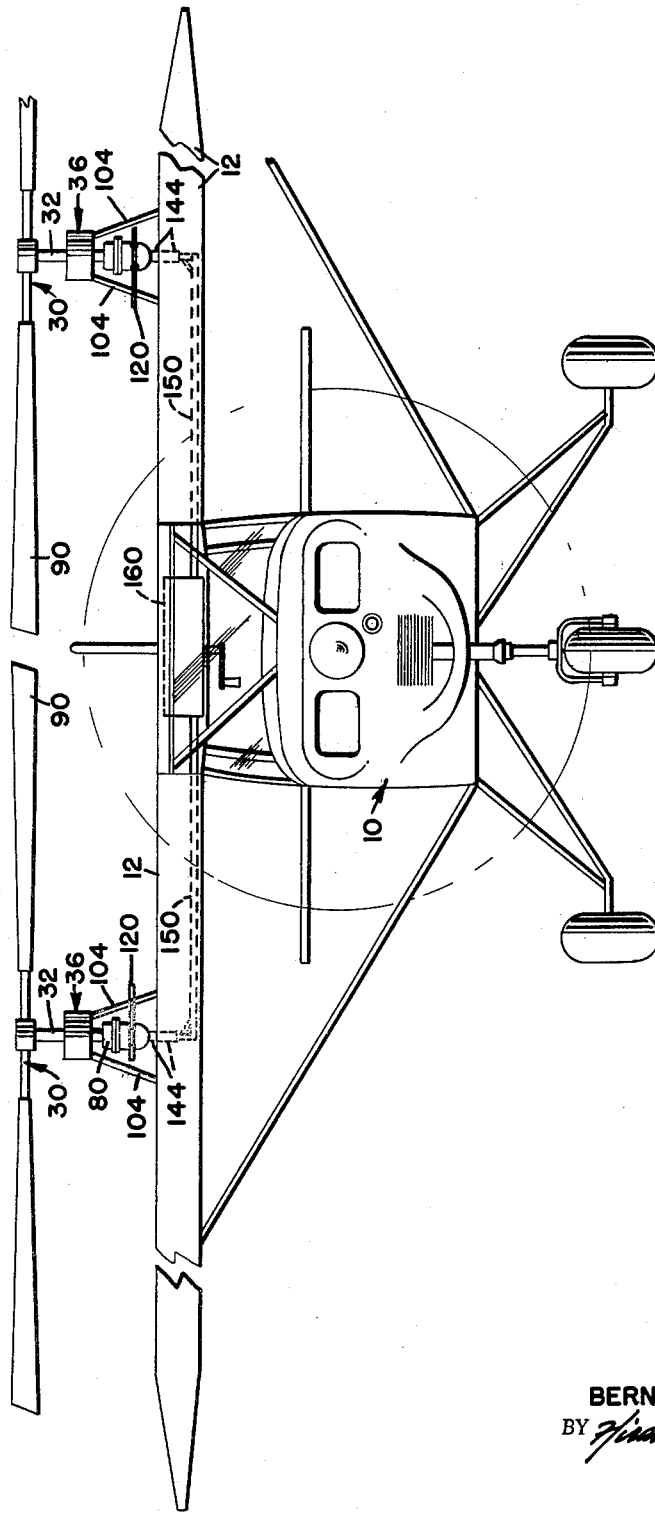

Filed Nov. 10, 1959   3 Sheets-Sheet 3

INVENTOR.
BERNHARDT STAHMER
BY 3,072,197
AIRCRAFT
Bernhardt Stahmer, 1509 Chicago St., Omaha, Nebr.
Filed Nov. 10, 1959, Ser. No. 852,021
3 Claims. (Cl. 170—135.2)

This invention relates to autogiro-type downward thrust propeller mechanisms for aircraft and more particularly it is an object of this invention to provide an aircraft equipped with such mechanisms for making possible the landing in a small space of an aircraft otherwise designed for forward travel at considerable speed driven by a standard vertically rotating rearward thrust propeller or other forward propulsion means.

Heretofore the use of autogiro propellers has made possible landing in very small places but the forward propulsion of autogiros has been primarily by the tilting of the vertical thrust propeller so that its thrust is delivered at an angle inclining slightly rearwardly, however this has heretofore been done with a single vertical thrust propeller.

It is a particular object of this invention to provide an aircraft having at least two vertical thrust propellers disposed on opposite sides of a rearward thrust propeller whereby the rearward thrust propeller creates a rearward rush of wind which tends to assist the driving of the two vertical thrust propellers.

A further object is to provide means for mounting one or more vertical thrust propellers above the wings of an aircraft otherwise designed for forward flight without use of a vertical thrust propeller.

Still another object is to provide a vertical thrust propeller mounting means which is adapted to permit the vertical thrust propeller to be tilted at the upper end of its shaft forwardly, rearwardly or to either side whereby the vertical thrust propeller can respectively be used for a certain amount of forward propulsion, a certain amount of rearward propulsion or braking effect, or to shift the aircraft sideways to avoid an obstacle such as a mountain or another aircraft.

A particular object is to provide an aircraft which is extremely movable.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIG. 1 is a side elevation of the aircraft of this invention;

FIG. 2 is a frontal elevation of the aircraft with portions of the wings removed for convenience of illustration;

FIG. 3 is a detail showing one of the downward thrust propeller shaft bearings with a forward portion broken away for illustrating the interior.

Figure 4:
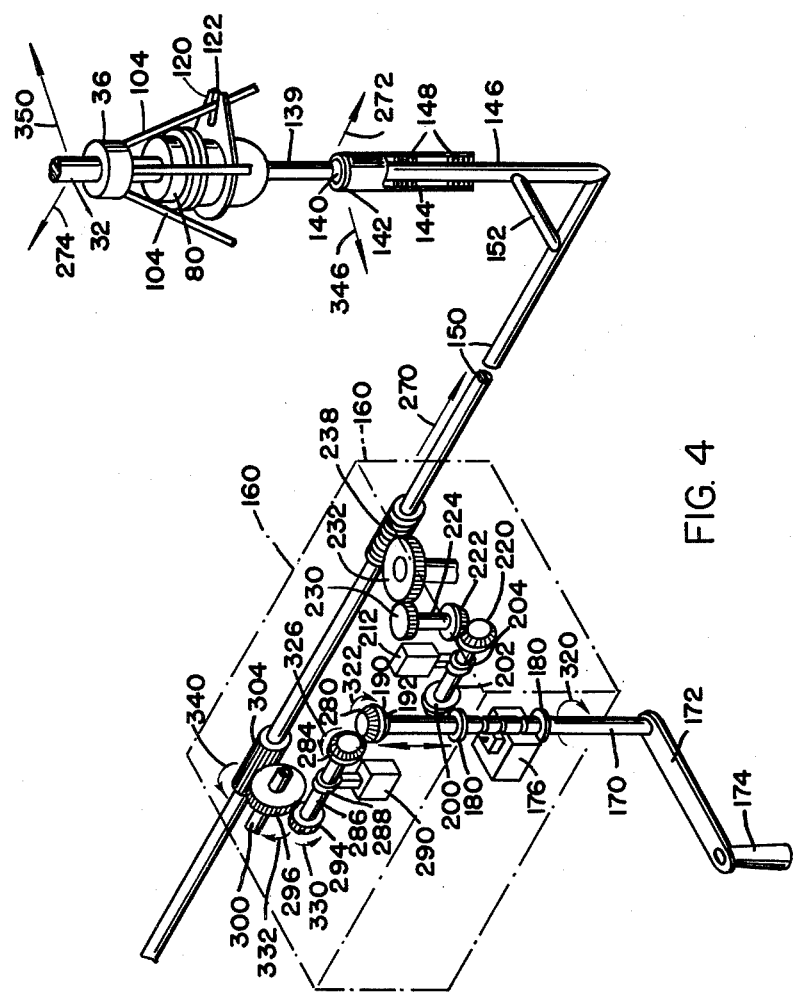
FIG. 4 is a semi-diagrammatic view showing the manner in which the tilt of the downward thrust propellers can be controlled from the operator's compartment, certain parts of the mechanism being broken away and other parts showing in dotted lines.

The aircraft of this invention is generally illustrated at 10 in FIG. 1 and is generally of a conventional construction having wings 12 extending outwardly from a fuselage 14, the wings 12 being above an operator's compartment 16, the aircraft 10 having a forward propeller 20 for directing a thrust of air rearwardly for forward propulsion, although it will be seen that any type of rearward thrust means tending to throw gas rearwardly can be used in place of propeller 20 in this invention.

In accordance with this invention, two horizontally rotating vertical thrust propeller assemblies, generally indicated at 30, are provided and the propeller assemblies 30 are particularly adapted for delivering a downward thrust for propulsion of the aircraft vertically upward, for hovering, and for making possible take-off and landing in a smaller space than would be otherwise possible.

The propeller assembly 30 of the type commonly used on helicopters and are mounted on shafts 32 which extend downwardly from each vertical thrust propeller 30.

Each shaft 32 is provided with a bearing 36. Each bearing 36 has a fixed portion 38 and a rotating and tilting portion 40.

The fixed portion 38 has two parts, an outer housing having a lower section 44 supporting an upper section 46 which latter is secured to the lower section 44 by means of screws 48. Held between the sections 44 and 46 is a track member 52 of annular shape with an opening therethrough extending from the upper to the lower side.

The walls of the opening 56 in the track member 52 are of a concave arcuate shape on any side as seen in vertical cross-section in FIG. 3 and are adapted to support the tilting and rotating portion 40 by means of ball bearings 58 which latter are rotatably mounted in the periphery of the tilting and rotating portion 40 and are adapted to travel across and roll on the concave surface 62 of the opening 56 of the track member 52.

The opening 56 is constricted at its lower and upper ends to provide shoulders 72 and 74 which latter prevent the ball bearings 58 from escaping from the track member 52.

As thus described it will be seen that the track member 52 is adapted to support the rotating and tilting portion 40 and that the rotating and tilting portion 40 is fixed to the respective propeller shaft 32 by means of collars 78 disposed on the shaft 32 above and below the rotatable members 40 whereby the rotating and tilting member 40 of each bearing 36 not only supports the shaft 32 but also the propeller 30 thereof supports a motor 80 which latter is mounted on the respective shaft 32 as best seen in FIG. 1.

Each motor 80 can be any one of many types. It can be an electric motor for example capable of driving the respective propellers 30 such that when both the propellers 30 are driven by a motor of the same type then the combined power is enough to cause the aircraft to be capable or raising itself off of the ground vertically.

Also the motor 80 can each be of the starter motor type in which case they are used for starting rotation of the propellers 30 and after the propellers 30 are once in motion they are thereafter driven continuously in the same way by the rearward thrust of gas, specifically air, from the forward propeller 20, as such rearward thrust travels across the fuselage 14 and directly against those blades 90 of the propellers 30 which, as best seen in FIG. 2, are disposed across the fuselage 14 at any given time. As thus described the propellers 30 would be caused to rotate counter-clockwise and in directions adapted to produce a downward thrust of air from each propeller.

At times when the propellers 30 are driven from the rearward thrust of the forward propeller 20, the electric motors 80 can be shut off and still substantial lifting power will be imparted by the propellers 30 for raising the aircraft upward.

It will also be seen that the motor 80 can be turbine or any other type of a motor that allows for autogyration, or if desired the motors 80 can be reciprocating motors in which a disengaging clutch may be used. However in general they can be considered motor means mounted on a shaft 32 and drivably connected thereto.

Means is provided for preventing the motors 80 from rotating with respect to the aircraft whereby the power of each motor 80 is delivered drivably to the respective vertical thrust propeller shaft 32. A preferred means for preventing this rotation movement of each motor 80 with respect to the aircraft comprises a sliding connection between a respective motor and certain supports or legs 104 which are attached to the bearings 36 respectively and extend downwardly to and are attached to the upper side of the wing 12 of the aircraft.

It will be understood that the shafts 32 are designed to be tilted forwardly, rearwardly and from side-to-side in order to cause the propellers 30 to direct their thrust of air rearwardly, forwardly and from side-to-side whereby the propellers 30 can be used as a braking force, a forward propulsion force, or can be used to cause the aircraft to move sideways to avoid obstacles such as mountain ranges or the like.

For this reason the tilting of the shaft means that the motor 80 must also be free to tilt, yet their rotation must be prevented. Consequently members 120 are attached to each motor and extend horizontally outwardly therefrom, as best seen in FIG. 4, such that a notch 120 as seen at 122 is adapted to receive one of the legs 104 for preventing rotation of the motor 80.

The electrical power for the motors 80, when electric motors 80 specifically are used, come through a tube 130 leading from the motor downwardly through a fitting 132 into the wing 12 of the aircraft for connection to a source of electrical power, not shown.

When the motors 80 are of a liquid fuel type, it will be seen that the tube 130 is for delivery of liquid fuel rather than having wiring in it.

However it will be also seen that when the motors 80 are of electric fuel type ignition therefor is supplied through wiring indicated at 136 and extending out of the fitting 132.

Referring now to FIG. 4, the means for controlling the tilt of the shaft 32 and the propeller 30 will now be discussed.

It will be seen at the bottom of each motor 80 is a shaft 139 to which is attached the ball portion 140 of a ball and socket joint, the socket portion of which 142 is attached to the vertically extending tubular member 144 into which a vertical rod 146 slidably extends, being adapted to slide with respect to tube 144 in suitable bearings 148 therebetween.

The rod 146 is connected to a horizontal rod 150 to which it is securely braced by a brace 152.

The horizontal rod 150, as seen in dotted lines in FIG. 2, extends inwardly of the wing section respectively and into the driver's compartment 16 of the aircraft where it enters a gear box diagrammatically shown in dotted lines at 160 in FIGURES 1 and 4 for clarity of illustration, but shown in full lines in FIG. 2.

The horizontal rod 150 extends from the vertical rod 146 under the right hand motor 80 entirely across through the wing 12 to the vertical rod 146 under the other propeller shaft 32.

As best seen in FIG. 4 a vertical crankshaft 170 extends out of the lower side of the gear box 160 and is provided with a horizontally extending crank 172 having a vertically extending handle 174.

Swinging of the handle 174 will cause rotation of its crankshaft 170, which is freely rotatably mounted in a bearing diagrammatically shown at 176. The bearing 176 is adapted to be engaged by certain collars 180 which are fixed to the shaft 170 and disposed above and below the bearing block 176 whereby the shaft 170 is limited in vertical movements because the collars 180 strike the upper and lower sides of the bearing block 176 respectively.

It will be seen that when the shaft 170 is in a lower position, a gear 190 on its upper end, and having teeth on its lower side at 192, is adapted to engage a gear 200 which latter is fixed to a horizontal shaft 202 carried in a bearing 204 supported by suitable mounting means 212 diagrammatically shown in FIG. 4. A gear 220 on the opposite end of the shaft 202 is adapted to engage a gear 222 disposed on a vertical shaft 224 which latter has a gear 230 attached to its upper sides. The gear 230 is enmeshed with a gear 232 which is itself adapted to engage teeth 238 which are in effect vertically disposed annular members surrounding the horizontal rod 150 equi-distantly spaced apart for engagement by the teeth of the gear 232 whereby when the gear 232 is rotated, the teeth 238 are engaged for causing the horizontal rod 150 to move horizontally in one direction or another in accordance with the direction that the crank handle 172 is rotated.

It will be seen that as the horizontal rod 150 is moved in the direction of an arrow 270 that the socket 142 makes a corresponding side motion in the direction of the arrow 272 whereby the lower end of the shaft 32 moves in the direction of the arrow 272, as best seen in FIG. 4. Because the shaft 32 is secured in a bearing 36, and pivots there, the upper end of the shaft 32 in question will then move in the direction of the arrow 274.

Rotation of the crank handle 174 in an opposite direction, likewise at times when the crankshaft 170 is in a downward position, will cause motion of all parts in an opposite direction from the respective arrows 270, 272 and 274 and in this way tilting of the respective propeller from side-to-side is controllable by the operator from the operator's compartment 16.

It will be seen that when the crankshaft 170 is maintained in an upper position as shown in FIGURE 4 in full lines, the collar 180 will be disposed against the lower side of the bearing box 176 and the gear 190 will have certain teeth 280 which are disposed on the upper side thereof in engagement with the pinion 284 which latter is mounted upon a horizontal shaft 286 extending transversely of the aircraft and mounted in a bearing 288 supported by suitable mounting means diagrammatically shown at 290.

An opposite end of the shaft 286 from the pinion 284 has a gear 294 on it which latter is in engagement with a gear 296 which is itself adapted to rotate in a vertical plane about a horizontal shaft 300, likewise extending transversely of the aircraft, and mounted on means, not shown for clarity and simplicity of illustration.

The gear teeth 296 are in engagement with teeth 304 which extend longitudinally of the horizontal rods 150, the teeth 304 being spaced apart during rotation of the gear 300 which will cause rotation of the gear 304.

As thus described rotation of the crankshaft 170 in direction of the arrow 320 causes rotation of the gear 190 in the direction of the arrow 322 and rotation of the gear 284 in the direction of an arrow 326, and rotation of a gear 294 in the direction of an arrow 330, and rotation of the gear 296 in the direction of an arrow 332 and for rotation of the teeth 304 and the horizontal shaft 150 in the direction of the arrow 340.

This in turn causes the socket 142 to swing in the direction of the arrow 346 and the lower end of the shaft 232 to move in a similar direction whereby the upper end of the shaft because of the pivoting at the bearing 36 thereby moves in the direction of an arrow 350 for causing a corresponding tilting of the respective vertical thrust propeller.

As thus described it will be seen that this invention fulfills the objectives hereinabove set forth.

I claim:

1. In an aircraft, two horizontally counter-rotating vertical downward thrust propeller assemblies, and means for mounting said assemblies on said aircraft comprising: a shaft extending downwardly from each vertical thrust propeller, each shaft being provided with a bearing, said bearings each having a fixed portion and a rotating portion, said bearings each rotatably supporting its respective shaft and each permitting the upper end of its shaft to swing forwardly, rearwardly and to each side with respect to said aircraft by pivoting at the respective bearing for permitting said respective vertical thrust propeller to tilt for facilitating control of said aircraft, means attaching said fixed portion of said bearings to said aircraft, a ball and socket joint attached to a lower end of the respective propeller shaft, and means attached to said ball and socket joint and extending into the operator's area of said aircraft whereby the operator can move said ball and socket joint forwardly, rearwardly or from side-to-side of said aircraft, each of said vertical thrust propeller assemblies being provided with a motor drivably attached thereto and swingable with the shaft thereof respectively and disposed on the underside of a respective bearing, and means for preventing rotation of said motor with respect to said aircraft whereby the power of said motor is delivered drivably to the respective vertical thrust propeller shaft.

2. In an aircraft, two horizontally counter-rotating vertical downward thrust propeller assemblies, and means for mounting said assemblies on said aircraft comprising: a shaft extending downwardly from each vertical thrust propeller, each shaft being provided with a bearing, said bearings each having a fixed portion and a rotating portion, said bearings each rotatably supporting its respective shaft and each permitting the upper end of its shaft to swing forwardly, rearwardly and to each side with respect to said aircraft by pivoting at the respective bearing for permitting said respective vertical thrust propeller to tilt for facilitating control of said aircraft, means attaching said fixed portion of said bearings to said aircraft, a ball and socket joint attached to a lower end of the respective propeller shaft, and means attached to said ball and socket joint and extending into the operator's area of said aircraft whereby the operator can move said ball and socket joint forwardly, rearwardly or from side-to-side of said aircraft, each of said vertical thrust propeller assemblies being provided with a motor drivably attached thereto and swingable with the shaft thereof respectively and disposed on the underside of a respective bearing, and means for preventing said motor from rotating with respect to said aircraft comprising a horizontally sliding connection between said motor and said bearing support means.

3. In an aircraft, two horizontally counter-rotating vertical downward thrust propeller assemblies, and means for mounting said assemblies on said aircraft comprising: a shaft extending downwardly from each vertical thrust propeller, each shaft being provided with a bearing, said bearings each having a fixed portion and a rotating portion, said bearings each rotatably supporting its respective shaft and each permitting the upper end of its shaft to swing forwardly, rearwardly and to each side with respect to said aircraft by pivoting at the respective bearing for permitting said respective vertical thrust propeller to tilt for facilitating control of said aircraft, means attaching said fixed portion of said bearings to said aircraft, a ball and socket joint attached to a lower end of the respective propeller shaft, and means attached to said ball and socket joint and extending into the operator's area of said aircraft whereby the operator can move said ball and socket joint forwardly, rearwardly or from side-to-side of said aircraft, each of said vertical thrust propeller assemblies being provided with a motor drivably attached thereto and swingable with the shaft thereof respectively and disposed on the underside of a respective bearing, said aircraft being provided with a fixed member adjacent each motor, and means for preventing rotational movement of said motor with respect to said aircraft comprising a sliding connection between said fixed member and said motor for permitting substantially horizontal sliding in a manner for the free movement of said motor forwardly, rearwardly and from side-to-side of said aircraft so as not to interfere with similar movements of the respective vertical thrust propeller shaft and so as to prevent rotation of said motor with respect to said fixed member.

References Cited in the file of this patent

UNITED STATES PATENTS

| | | |
|---|---|---|
| 1,491,310 | Perrin | Apr. 22, 1924 |
| 1,578,833 | Kogler | Mar. 30, 1926 |
| 1,957,813 | Wilford | May 8, 1934 |
| 1,980,980 | Campbell | Nov. 20, 1934 |
| 2,074,342 | Platt | Mar. 23, 1937 |
| 2,224,357 | Pecker | Dec. 10, 1940 |
| 2,339,836 | Campbell | Jan. 25, 1944 |
| 2,344,966 | Campbell | Mar. 28, 1944 |
| 2,404,014 | Thornes | July 16, 1946 |
| 2,819,029 | Medvedeff | Jan. 7, 1958 |
| 2,886,261 | Robert et al. | May 12, 1959 |